(12) United States Patent
Rossmann

(10) Patent No.: US 9,972,172 B2
(45) Date of Patent: May 15, 2018

(54) ASSISTED APPROVAL OF DENIED SELF-SERVICE TRANSACTIONS

(71) Applicant: NCR Corporation, Duluth, GA (US)

(72) Inventor: Wolf Rossmann, Scotland (GB)

(73) Assignee: NCR Corporation, Atlanta, GA (US)

( * ) Notice: Subject to any disclaimer, the term of this patent is extended or adjusted under 35 U.S.C. 154(b) by 666 days.

(21) Appl. No.: 14/265,784

(22) Filed: Apr. 30, 2014

(65) Prior Publication Data

US 2015/0317628 A1 Nov. 5, 2015

(51) Int. Cl.
  *G06Q 40/00* (2012.01)
  *G07F 19/00* (2006.01)
  *G06Q 20/18* (2012.01)

(52) U.S. Cl.
  CPC .......... *G07F 19/209* (2013.01); *G06Q 20/18* (2013.01); *G07F 19/20* (2013.01)

(58) Field of Classification Search
  CPC .................. G06Q 20/40; G06Q 20/1085
  See application file for complete search history.

(56) References Cited

U.S. PATENT DOCUMENTS

| | | | |
|---|---|---|---|
| 7,143,069 B2 | 11/2006 | Lacivita et al. | |
| 7,954,706 B2 * | 6/2011 | Calabrese | G06Q 20/40 235/379 |
| 7,979,502 B2 | 7/2011 | Lamparello et al. | |
| 2003/0208439 A1 * | 11/2003 | Rast | G06Q 20/04 705/38 |
| 2005/0033681 A1 | 2/2005 | Cucinotta et al. | |
| 2007/0084913 A1 * | 4/2007 | Weston | G06Q 20/20 235/380 |
| 2013/0002428 A1 | 1/2013 | Cueli et al. | |
| 2013/0018788 A1 * | 1/2013 | Johnson | G06Q 20/18 705/43 |
| 2013/0024289 A1 * | 1/2013 | Cueli | G06Q 20/027 705/14.65 |
| 2015/0120542 A1 * | 4/2015 | Byers | G06Q 20/40 705/43 |

FOREIGN PATENT DOCUMENTS

| | | |
|---|---|---|
| CN | 101025843 A | 8/2007 |
| CN | 101097625 A | 1/2008 |
| EP | 1022699 A2 | 7/2000 |

OTHER PUBLICATIONS

"ITU-T Adaption of H.320 visual telephone terminals to B-ISDN environments", May 4, 1998 (May 4, 1998) XP055193131, Retrieved from the Internet: https://www.itu.int/rec/T-REC-H.321-199802-I/en [retrieved on Jun. 2, 2015] *the whole document *.

* cited by examiner

Primary Examiner — Scott S Trotter
(74) Attorney, Agent, or Firm — Schwegman, Lundberg & Woessner

(57) ABSTRACT

A Self-Service Terminal (SST) transaction is denied over an SST network. Transaction details for the transaction are sent over a second network to an assistant. The transaction details are evaluated to determine whether to override the transaction on the second network or whether to provide assistance to a customer associated with the transaction to successfully reprocess the transaction at the SST.

20 Claims, 4 Drawing Sheets

ASSISTED APPROVAL OF DENIED SELF-SERVICE TRANSACTIONS

BACKGROUND

Increasingly, enterprises are deploying Self-Service Terminals (SSTs) at various locations for use by consumers. The locations can include financial institutions, grocery stores, retail stores, government venues, entertainment venues, gaming venues, transportation venues, and the like.

One type of SST is an Automated Teller Machine (ATM). ATMs present unique changes to a servicing enterprise because security is of utmost concern. In fact, network access to the ATM network, which the ATM communicates with for financial transactions, is often unavailable for access to servicing engineers. Moreover, when a customer transacts at an ATM, the ATM network may switch to a different bank network because the ATM where the customer transacts may be associated with a different bank from a customer bank account used for the customer transaction.

Some banks include automated teller or interactive banking services for customers at one of their ATMs. This enables teller assistance for Self-Service (SS) transactions, but these services only work for transactions that are not routed through a standard ATM network. So, when a standard transaction occurs through a standard ATM network, the customer receives little assistance.

Assistance is an issue when a customer is denied a transaction by the ATM network. The customer is given no reason or rationale for the denial. In many cases, all the customer receives is a standard message "unable to complete this transaction at this time." It may have nothing to do with the customer; the ATM may not have sufficient cash to dispense in the amount the customer requested. But, the customer has no idea why the transaction was denied. Some customers may even panic and think that their accounts were compromised in some manner. Also, often times the receipt printed for a denied transaction (if one is printed at all) offers no additional details to permit the customer to ascertain what the issue was with the denied transaction. This is frustration to the customer and can lead to a bank losing the valued customer.

SUMMARY

In various embodiments, methods and an SST for assisted approval of denied Self-Service (SS) transactions are presented.

According to an embodiment, a method for assisted approval of denied SS transactions are provided. Specifically, a device receives transaction details for a denied transaction occurring at a Self-Service Terminal (SST). The denied transaction occurring over an SST network and the transaction details received over a different network. Next, a determination is made as to whether to override the denied transaction to allow the denied transaction using the different network.

DETAILED DESCRIPTION

Figure 1:
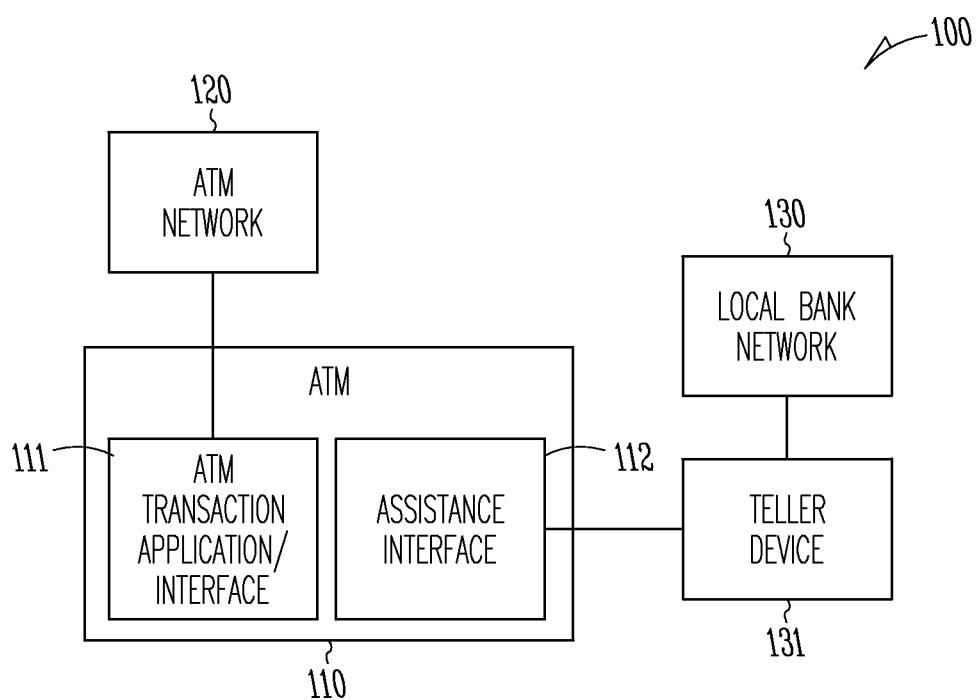
FIG. 1 is a diagram of components for practicing assisted approval of denied Self-Service (SS) transactions, according to an example embodiment.

FIG. 1 is a diagram 100 of components for practicing assisted approval of denied Self-Service (SS) transactions, according to an example embodiment. It is to be noted that the ATM 110 is shown schematically in greatly simplified form, with only those components relevant to understanding of this embodiment being illustrated. The same situation may be true for the teller device 131.

Furthermore, the various components (that are identified in the FIG. 1) are illustrated and the arrangement of the components is presented for purposes of illustration only. It is to be noted that other arrangements with more or less components are possible without departing from the teachings of assisted approval of denied Self-Service (SS) transactions, presented herein and below.

Furthermore, methods and SST presented herein and below for assisted approval of denied Self-Service (SS) transactions can be implemented in whole or in part in one, all, or some combination of the components shown with the diagram 100. The methods are programmed as executable instructions in memory and/or non-transitory computer-readable storage media and executed on one or more processors associated with the components.

Specifically, the diagram 100 permits assisted approval of denied Self-Service (SS) transactions utilizing two networks (ATM network 120 and Local Bank Network 130). The details of this approach in view of the components, within the diagram 100, are now presented with reference to an embodiment of the FIG. 1 within the context of an ATM 110.

However, before discussion of the diagram 100 is presented, it is to be noted that the methods and SST presented herein are not limited to ATM solutions; that is, any SST terminal (kiosk, vending machine, check-in and/or check-out terminal, such as those used in retail, hotel, car rental, healthcare, or financial industries, etc.) can benefit from the assisted approval of denied Self-Service (SS) transactions discussed herein.

The diagram 100 includes an ATM 110, an ATM network 120, a local bank network 130, and a teller device 131. The ATM 110 includes an ATM transaction/application interface and an assistance interface 112.

The techniques and features of assisted approval of denied Self-Service (SS) transactions are illustrated with reference to the components of the diagram 100 for an ATM transaction for customer performing an ATM transaction at the ATM 110 where that transaction is, at least initially, denied by the ATM network 120.

When the customer accesses the ATM transaction/application interface 111 to conduct an ATM transaction that transaction is processed with the ATM 110 through the ATM network 120. For any number of reasons the transaction can fail based on the transaction details some of which may have been improperly entered by the customer or some of which are not permitted by policy associated with the ATM 110 or the bank of the customer from which the ATM network 120 communicates. For any of these reasons (and others not listed), the ATM transaction is denied.

Typically, when this occurs the customer is provided little to no useful information about why the ATM transaction failed; rather, a message appears or is printed on the receipt that says transaction failed or could not be completed. This is frustrating and confusing to the customer and in some cases may incite a panic attack with the customer believing the customer's account was compromised in some manner.

With the techniques herein, the convention situation is changed and the customer is provided real time assistance in the manners described herein.

When the ATM transaction is denied, the transaction details are obtained from the ATM 110 associated with where the customer is performing the ATM transaction in real time (this can be done via a link between the ATM 110 to the assistance interface 112 or based on notice sent from the bank network communicating with the ATM network 120, where that bank network communicates the denial to the local bank network 130). For example, the bank associated with approving and processing the transaction is contacted within the ATM network 120 to complete the transaction. That bank receives the denial, which includes an ATM identifier that identifies the ATM 110 and its location. The teller then obtains the transaction details from the ATM 110, which includes customer account and, perhaps, other information to the local bank network 130 where that ATM 110 is located. This can be done in a number of manners, for example a local server of the bank acts a secure proxy between the ATM network 120, the ATM 110, and the local bank network 130 (not shown in the FIG. 1). In this embodiment, the transaction details are acquired by the proxy before being passed to the ATM network 120 and the denial is acquired by the proxy before being passed to the ATM 110. So, the teller at the teller device 131 can acquire the transaction details and the denial in a variety of manners.

Once the transaction details are obtained by the local bank network 130 (such as at a local proxy (not shown in the FIG. 1), the transaction details can be routed to a queue for teller's to select, sent to a teller for action based on teller load at the time the transaction details are received, or sent to a specific teller. When a teller is assigned the transaction details or when the teller selects the transaction details, the teller can view and analyze the transaction details. The transaction details inform the teller as to which ATM 110 that the customer is performing the current ATM transaction that was denied. The teller can also use the transaction details to access backend systems of the bank through the local bank network for purposes of obtaining customer account history, customer name, account status, and the like.

The teller then uses one or more interfaces on the teller device 131 to make a decision as to whether based on the transaction details and, perhaps, the customer details (account history, status, etc.) to override the denial and permit the transaction. The teller then uses the teller device 131 to access the local bank network 130 (such as through the proxy of via a direct connection) and override the transaction using the bank's backend systems. The override can be communicated through the local bank network 130 to the assistance interface 112 on the ATM 110.

One or more screens within a display of the ATM 110 present the override decision to the customer in real time. The teller may then approach the customer with any funds related to the transaction and/or receipts for the customer to conclude the transaction, which was initially denied over the ATM network 120.

In another case, assuming the assistance interface 112 has proper security can control of the peripherals of the ATM 110, which may not be the case in a typical scenario but could be in some embodiments, The assistance interface could dispense cash and receipts to conclude the transaction (which was originally denied) from the ATM 110 directly to the customer.

In some situations, the teller may not be able to override the ATM transaction but the teller has information relevant to the customer and the transaction and may be able to ascertain why the transaction is being denied and a manner in which the customer can successfully reinitiate the transaction. For example, the customer may have inadvertently requested too much cash adding an extra 0 or may have accessed one account of the customer with insufficient funds whereas another account of the customer had plenty of funds to conduct the transaction; other situations may occur as well.

In such a scenario, the teller can use the teller device 131 to send a request for assistance to the customer over the local bank network 130. This request is presented in one or more screens on the display of the ATM 110 through the assistance interface 112.

When the customer activates (selects) the request for assistance, the teller can engage in direct real-time assistance to the customer regarding the transaction and provide instructions on how the customer might reinitiate the transaction at the ATM 110 for it to be successful or explain to the customer why the transaction cannot be successful.

The real-time assistance can be, in some cases, done in person by the teller walking over to the ATM 110 to converse with the customer (personal approach). Alternatively, the assistance can be remote with a real-time live video session or a real-time live chat session both conducted remotely by the teller through the teller device 131 using the local bank network to interact with the customer through the assistance interface 112 on the ATM 110.

It is noted that in some cases, the override can be done after engaging permission from the customer through an activated request for assistance; for example, the teller may not know if the customer wants the funds from a different account of the customer from what was used with the initial ATM transaction, such that the customer approval and interaction is needed before the teller can actually perform the override on behalf of the customer. In such a case, the customer need not reinitiate the transaction, since the teller is doing that with the override (actually a new transaction in this example performed by the teller on behalf of the customer).

Moreover, in some cases, policy may dictate that the teller acquire an activated request for assistance before the teller can perform any override on behalf of the customer. In such a situation, before any override is performed the customer consent is acquired through the request for assistance and directly communicating with the customer (in person or remotely through video or message sessions using the assistance interface 112).

In an embodiment, the teller device 131 is a tablet.

In an embodiment, the teller device 131 is a wearable processing device.

In an embodiment, the teller device 131 is a terminal device.

In an embodiment, the teller device 131 can communicate over the local bank network using a wireless connection.

In an embodiment, the teller device 131 can communicate over the local bank network using a wired connection.

In an embodiment, the teller device 131 can communicate over the local bank network using both a wired and wireless connection.

One now appreciates how real-time automated or semi-automated customer assistance can be provided for a denied ATM transaction of a customer at an ATM 110.

Figure 2:
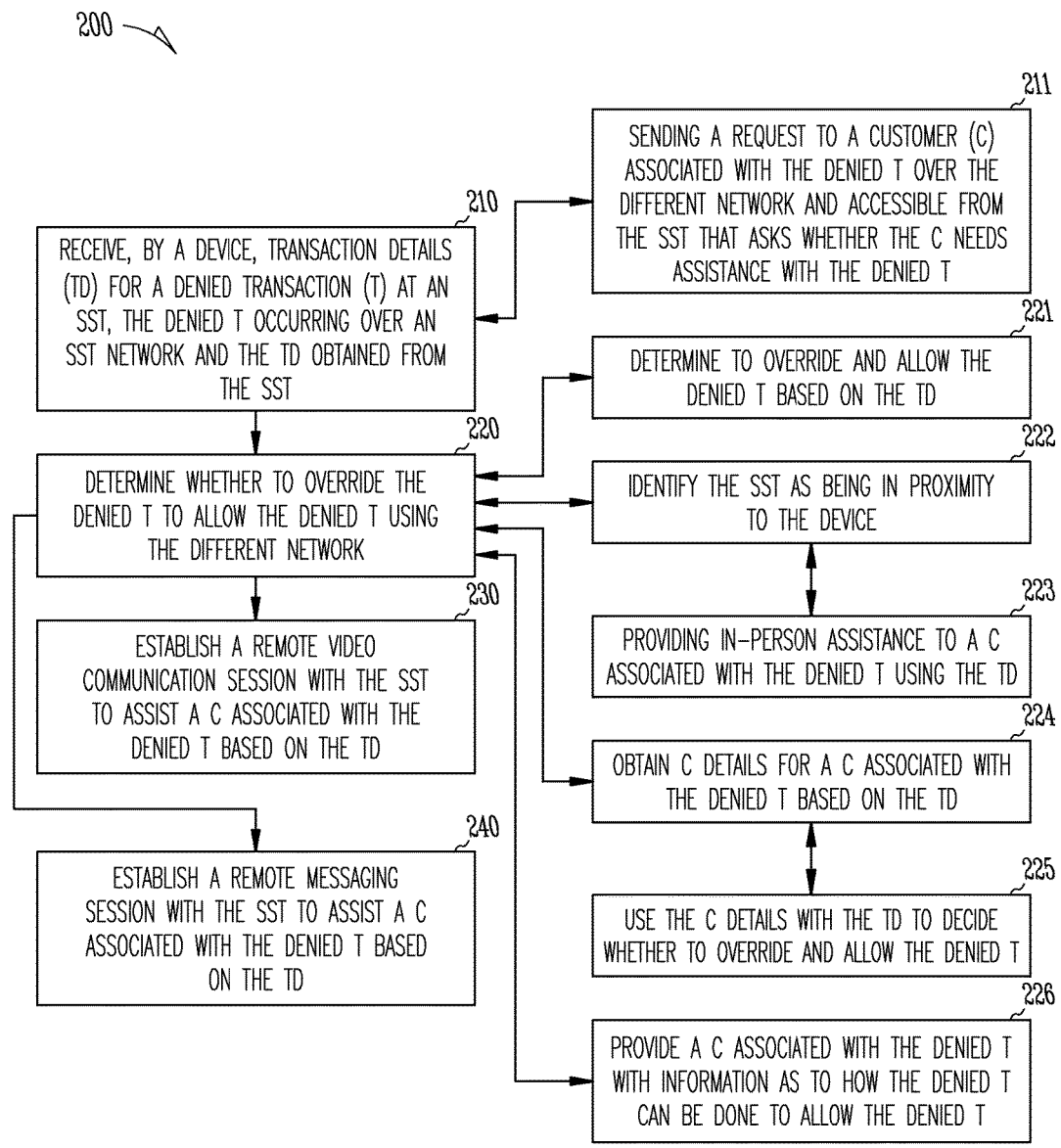
FIG. 2 is a diagram of a method for assisted approval of denied SS transactions, according to an example embodiment.
Figure 3:
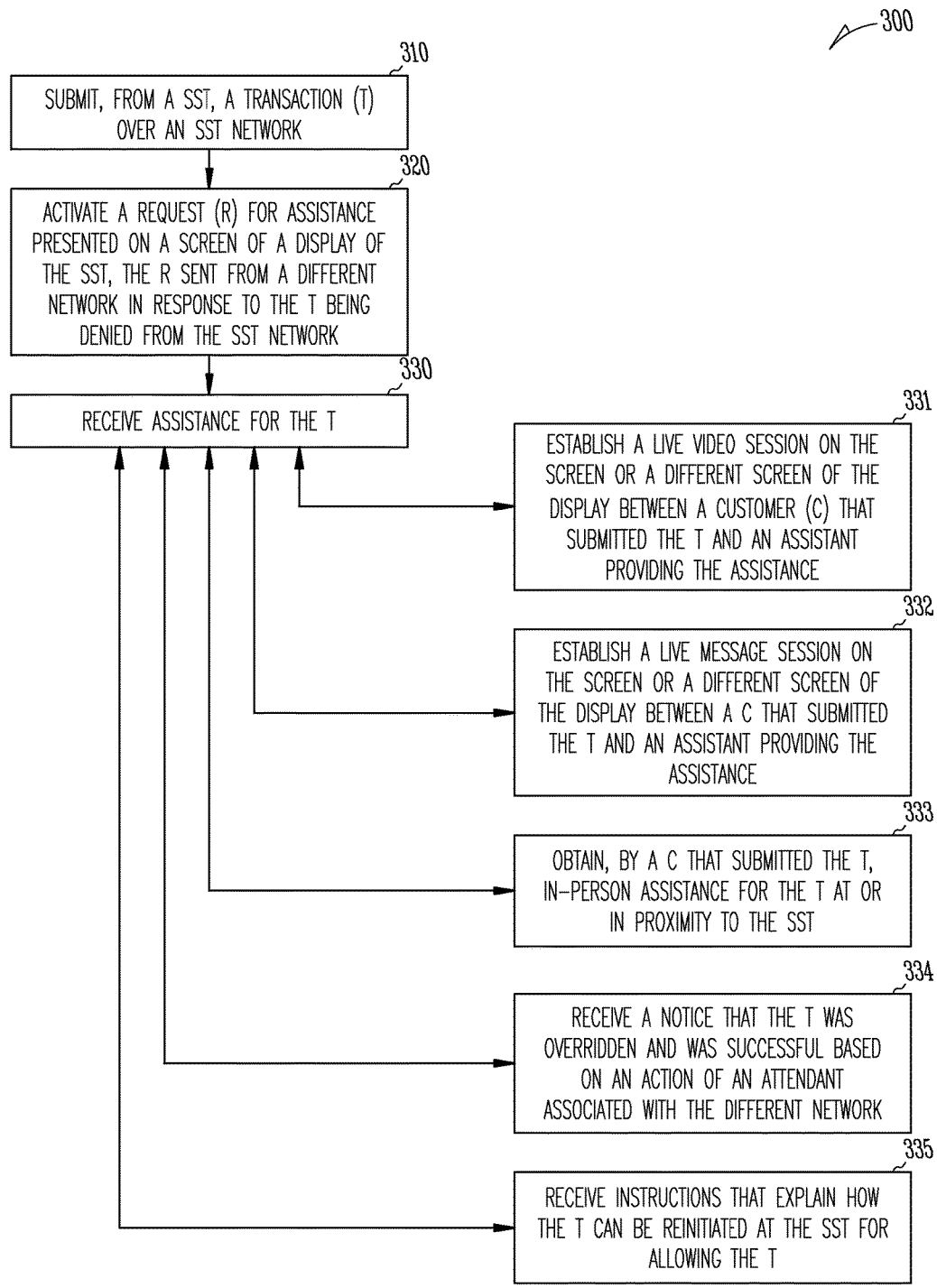
FIG. 3 is a diagram of another method for assisted approval of denied SS transactions, according to an example embodiment.
Figure 4:
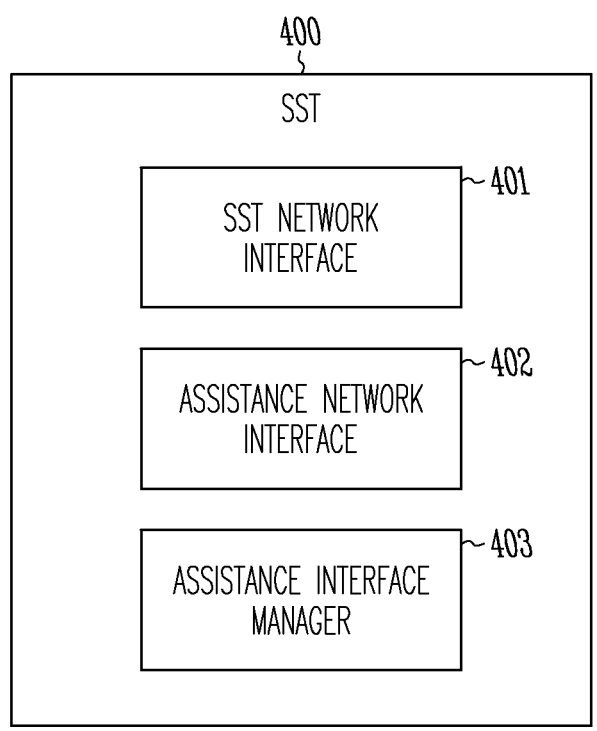
FIG. 4 is a diagram of a Self-Service Terminal (SST), according to an example embodiment.

Some embodiments of the diagram 100 and other embodiments of the assisted approval of denied Self-Service (SS) transactions are now discussed with the descriptions of the FIGS. 2-4.

FIG. 2 is a diagram of a method 200 for assisted approval of denied SS transactions, according to an example embodiment. The software module(s) that implements the method 200 is referred to as an "assistance manager." The assistance manager is implemented as executable instructions programmed and residing within memory and/or a non-transitory computer-readable (processor-readable) storage medium and executed by one or more processors of a device. The processor(s) of the device that executes the assistance manager are specifically configured and programmed to process the assistance manager. The assistance manager has access a network during its processing. The network can be wired, wireless, or a combination of wired and wireless.

In an embodiment, the device that executes the assistance manager is the teller device 131 of the FIG. 1.

The processing of the assistance manager assumes that a transaction at a Self-Service Terminal (SST) being conducted by a customer was denied by a SST network, which the assistance manager does not have access to.

In an embodiment, the SST is the ATM 110 of the FIG. 1.

In an embodiment, the SST is a kiosk.

In an embodiment, the SST is a Self-Service grocery store checkout station.

At 210, the assistance manager receives (on the device that executes the assistance manager) transaction details for a denied transaction at a SST. The denied transaction occurs over an SST network and the transaction details obtained from the SST. The assistance manager has access to the different network but not access to SST network where the transaction was initially denied.

According to an embodiment, at 211, the assistance manager sends a request to a customer associated with the denied transaction over the different network and accessible from the SST. The request asks whether the customer wants real-time assistance with the denied transaction. The request presented within a screen associated with the SST and managed by a separate interface from that which the customer used to connect to the SST network and perform the initially denied SST transaction.

At 220, the assistance manager determines whether to override the denied transaction to allow the denied transaction using the different network. This is based on analysis of the transaction details for the transaction and/or additional customer details associated with the customer acquired through the transaction details or through separate customer loyalty information associated with the customer and linked to the transaction details.

In an embodiment, at 221, the assistance manager determines to override and allow the denied transaction based on the transaction details.

In an embodiment, at 222, the assistance manager identifies the SST as being in proximity to the device that executes the assistance manager. This can be done via an identifier for the SST supplied with the transaction details.

In an embodiment of 222 and at 223, the assistance manager provides in-person assistance to the customer associated with the denied transaction using the transaction details. So, an assistant that interacts via an interface of the device with the assistance manager locates the SST for the customer, inspects the transaction details, and walks over to the customer to assist in real time.

In an embodiment, at 224, the assistance manager obtains customer details for a customer associated with the denied transaction based on the transaction details, such as account details, loyalty details (loyalty level, etc.), account status, account history, etc. This information is relevant and provides a personalized approach in assisting the customer with the denied transaction.

In an embodiment of 224 and at 225, the assistance manager uses the customer details to decide whether to override and allow the denied transaction. Some situations of this were discussed above where the SST was the ATM 110. Other situations for non ATMs that are the SST may include customer loyalty level permitting the override for the denied transaction, and the like.

In an embodiment, at 226, the assistance manager provides the customer associated with the denied transaction with information as to how the denied transaction can be done to allow the denied transaction, either through interaction with the assistance manager or through reinitiating a transaction at the SST over the SST network.

According to an embodiment, at 230, the assistance manager establishes a remote video communication session with the SST to assist the customer associated with the denied transaction based on the transaction details. Again, this can be done through an interface on the SST and occurs over the different network (not the SST network).

In an embodiment, at 240, the assistance manager establishes a remote messaging session with the SST to assist the customer associated with the denied transaction based on the transaction details, using an interface on the SST and over a network that is different from the SST network where the transaction was initially denied.

FIG. 3 is a diagram of another method 300 for assisted approval of denied SS transactions, according to an example embodiment. The software module(s) that implements the method 300 is referred to as a "SST assistance interface." The SST assistance interface is implemented as executable instructions programmed and residing within memory and/or a non-transitory computer-readable (processor-readable) storage medium and executed by one or more processors of an SST. The processors that execute the SST assistance interface are specifically configured and programmed to process the SST assistance interface. The SST assistance interface has access to at least two networks during its processing. Each network can be wired, wireless, or a combination of wired and wireless.

In an embodiment, the SST is the ATM 110 of the FIG. 1.

In an embodiment, the SST is a kiosk.

In an embodiment, the SST is self-service grocery checkout station.

In an embodiment, the SST assistance interface is the assistance interface 112 of the FIG. 1.

At 310, the SST assistance interface submits a transaction over an SST network, the transaction initially defined by a customer at the SST transacting with the SST.

At 320, the SST assistance interface activates a request for assistance presented on a screen of a display of the SST. The request may be available as an interface selection at the SST within the screen at all times a customer is transaction or may be presented within the screen when conditions make it likely the customer is in need of assistance. In an embodiment, the request is sent from a network that is different from the SST network as an "offer for assistance" and the offer for assistance (request) sent based on the transaction being denied from the SST network.

In an embodiment, the request (offer for assistance) is sent from the teller device 131 of the FIG. 1.

In an embodiment, the request (offer for assistance) is sent from the assistance manager of the FIG. 2.

At 330, the SST assistance interface receives assistance for the transaction. This assistance can be received at the SST by the SST assistance interface in a number of manners.

For example, at 331, the SST assistance interface establishes a live video session on the screen or on a different screen of the display between a customer that submitted the transaction and an assistant providing the assistance and operating an assistant device independent of the SST.

In another case, at 332, the SST assistance interface establishes a live message session on the screen or on a different screen of the display between a customer that submitted the transaction and an assistance providing the assistance and operating an assistant device independent of the SST.

According to an embodiment, at 333, the customer that submitted the transaction obtains in-person assistance for the transaction by an assistant at the SST or in proximity to the SST.

In an embodiment, at 334, the SST assistance interface receives a notice (presented on a screen of the display) that the transaction was overridden and was successful or will be successful shortly based on an action of an attendant associated with the different network (a network that is not the SST network where the SST transaction was initially conducted and denied).

In an embodiment, the SST assistance interface receives instructions (presented on a screen of the display), which explain how the transaction can be reinitiated at the SST for allowing the transaction over the SST network (the instructions received over a different network from the SST network).

FIG. 4 is a diagram of an SST 400, according to an example embodiment. The components of the SST 400 are programmed and reside within memory and/or a non-transitory computer-readable medium and execute on one or more processors of the SST 400. The SST 400 communicates and has access to at least two networks, which can be wired, wireless, or a combination of wired and wireless.

In an embodiment, the SST 400 is the ATM 110 of the FIG. 1.

In an embodiment, the SST 400 is a kiosk.

In an embodiment, the SST 400 is a self-service grocery checkout station.

The SST 400 includes an SST network interface 401, an assistance network interface 402, and an assistance interface manager 403.

The SST network interface 401 permits the SST 400 to communicate over an SST network.

In an embodiment, the SST network is the ATM network 120 of the FIG. 1.

The assistance network interface 402 permits the SST 400 to communicate over an assistance network.

In an embodiment, the assistance network is the local bank network 130 of the FIG. 1.

The assistance interface manager 403 is configured and adapted to: execute on the SST 400, submit a transaction over the SST network using the SST network interface 401, present a request for assistance on a screen of a display associated with the SST 400 in response to the transaction being denied over the assistance network using the assistance network interface 402, and send an activated request for assistance over the assistance network using the assistance network interface 402 to obtain assistance for the transaction.

According to an embodiment, the assistance interface manager 403 is further adapted and configured to establish a live communication session on the screen or a different screen of the display for interaction between a customer that is conducting the transaction (which is currently denied) and an assistant communicating over the assistance network. In an embodiment, the live communication session is one of: a live video session and a live messaging session.

One now appreciates how automated or semi-automated real-time assisted approval of denied self-service transactions can be achieved via SSTs and other remote devices in communication with the SSTs.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   receiving, by a device, transaction details for a denied transaction at a Self-Service Terminal (SST), the denied transaction was denied over an SST network and the transaction details obtained from the SST; and
   determining whether to override the denied transaction to allow the denied transaction using a different network from the SST network and communicating to the SST that the denied transaction was processed on behalf of a customer operating the SST while the customer is at the SST, wherein the SST is configured for processing customer transactions through the SST network without assistance from the different network, and wherein the method processing is automatically invoked upon receiving the denied transaction.

2. The method of claim 1 further comprising, establishing a remote video communication session with the SST to assist the customer associated with the denied transaction based on the transaction details.

3. The method of claim 1 further comprising, establishing a remote messaging session with the SST to assist the customer associated with the denied transaction based on the transaction details.

4. The method of claim 1, wherein receiving further includes sending a request to the customer associated with the denied transaction over the different network and accessible from the SST that asks whether the customer needs assistance with the denied transaction.

5. The method of claim 1, wherein determining further includes determining to override and allow the denied transaction based on the transaction details.

6. The method of claim 1, wherein determining further includes identifying the SST as being in proximity to the device.

7. The method of claim 6, wherein identifying further includes providing in-person assistance to the ft customer associated with the denied transaction using the transaction details.

8. The method of claim 1, wherein determining further includes obtaining customer details for the ft customer associated with the denied transaction based on the transaction details.

9. The method of claim 8, wherein obtaining further includes using the customer details with the transaction details to decide whether to override and allow the denied transaction.

10. The method of claim 1, wherein determining further includes providing the customer associated with the denied transaction with information as to how the denied transaction can be done to allow the denied transaction.

11. A method, comprising:
submitting, from a Self-Service Terminal (SST), a transaction for processing over an SST network;
activating a request for assistance presented on a screen of a display of the SST, the request sent from a different network in response to the transaction being denied from the SST network; and
receiving assistance for the transaction once denied over the SST network through interaction over the different network, and wherein the SST is configured for processing customer transactions through the SST network without assistance over the different network and automatically invoking the method processing by activating the request from the SST upon receipt of the transaction being denied.

12. The method of claim 11, wherein receiving further includes establishing a live video session on the screen or a different screen of the display between a customer that submitted the transaction and an assistant providing the assistance.

13. The method of claim 11, wherein receiving further includes establishing a live message session on the screen or a different screen of the display between a customer that submitted the transaction and an assistant providing the assistance.

14. The method of claim 11, wherein receiving further includes obtaining, by a customer that submitted the transaction, in-person assistance for the transaction at or in proximity to the SST.

15. The method of claim 11, wherein receiving further includes receiving a notice that the transaction was overridden and was successful based on an action of an attendant associated with the different network.

16. The method of claim 11, wherein receiving further includes receiving instructions that explain how the transaction can be reinitiated at the SST for allowing the transaction.

17. A Self-Service Terminal (SST), comprising:
an SST network interface for an SST network;
an assistance network interface for an assistance network; and
an assistance interface manager configured and adapted to: i) execute on the SST, ii) submit a transaction for processing over the SST network, iii) present a request for assistance on a screen of a display associated with the SST in response to the transaction being denied over the SST network through interactions with the assistance network, and iv) send an activated request for assistance over the assistance network to obtain assistance for the transaction, wherein the SST is configured for processing customer transactions without assistance over the assistance network and automatically invoking the processing for assistance when the transaction is denied over the SST network.

18. The SST of claim 17, wherein the assistance interface manager is further configured and adapted to v) establish a live communication session to obtain assistance on the screen or a different screen of the display.

19. The SST of claim 18, wherein the live communication session is one of: a live video session and a live messaging session.

20. The SST of claim 17, wherein the SST is an Automated Teller Machine (ATM) and the assistance network is a bank network associated with a specific bank.

* * * * *